E. F. ROLFF.
NON-PUNCTURABLE PNEUMATIC TIRE.
APPLICATION FILED AUG. 7, 1911.

1,083,562.

Patented Jan. 6, 1914.

WITNESSES

INVENTOR
E. F. Rolff,
By F. M. Wright
Atty.

UNITED STATES PATENT OFFICE.

EDWARD F. ROLFF, OF SACRAMENTO, CALIFORNIA.

NON-PUNCTURABLE PNEUMATIC TIRE.

1,083,562.  Specification of Letters Patent.  Patented Jan. 6, 1914.

Application filed August 7, 1911. Serial No. 642,807.

*To all whom it may concern:*

Be it known that I, EDWARD F. ROLFF, a citizen of the United States, residing at Sacramento, in the county of Sacramento and State of California, have invented new and useful Improvements in Non-Puncturable Pneumatic Tires, of which the following is a specification.

The object of the present invention is to provide means for rendering a pneumatic tire non-puncturable without materially reducing its resiliency.

Figure 1:
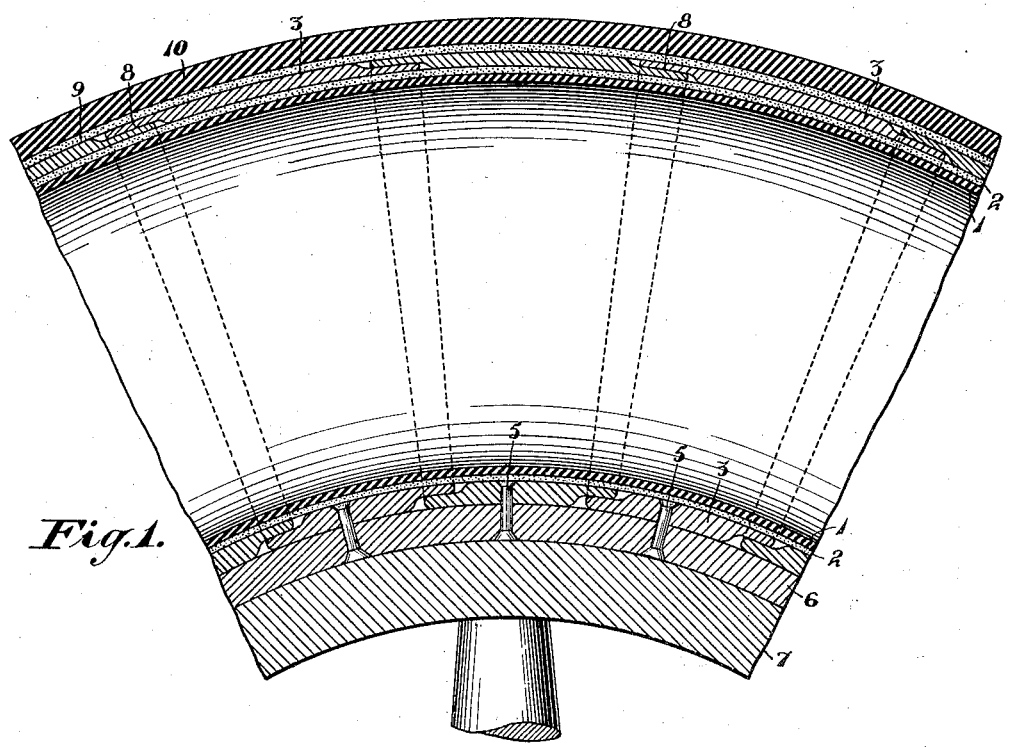
Figure 2:
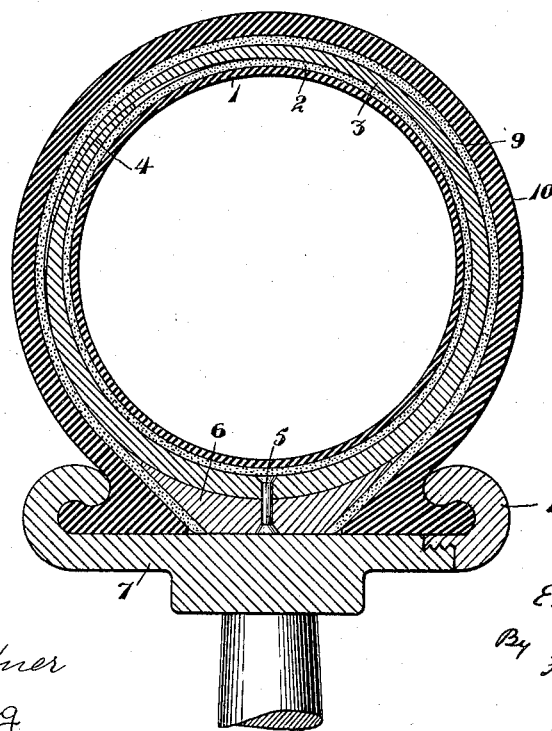

In the accompanying drawing, Figure 1 is a broken longitudinal section of my improved tire; Fig. 2 is a cross section thereof.

Referring to the drawing, 1 indicates a pneumatic inner tube of the usual construction. Surrounding this inner tube is a tube 2 of heavy canvas or rawhide, saturated with graphite and oil. Surrounding the canvas tube 2 are a circumferential series of tubular springs 3. Each spring is formed from a plate tapering in thickness from the middle to the terminal portions, and said terminal portions overlap one another, as clearly shown at 4, in Fig. 2. Said springs are attached by rivets 5 to a steel band 6, surrounding the rim 7 of the wheel having a detachable rim flange 11, said band being suitably concaved on its outer side to fit snugly against the adjacent portions of the springs. The ends of the tubes formed by said springs are in radial planes transverse to the plane of the wheel and the terminal portions of the tubes formed by the several springs are reduced in thickness to about one-half as shown at 8 in Fig. 1, being reduced at the outside at one end of the tube and on the inside at the other end, to permit of adjacent ends of the tubes overlapping without causing irregularities or ridges in the outer surface of the tire. Said springs, and likewise said steel band are surrounded by a tube 9 of very heavy canvas saturated with graphite and oil. Around said tube 9 is placed an outer rubber tire 10, which is of ordinary construction, and which is secured to the rim in a customary manner. The purpose of the tubes 2 and 9 of canvas is to protect the inner and outer tubes respectively from the wearing action of the springs, and the purpose of the graphite and oil is to reduce the friction of the steel springs. The thickness of the steel springs is varied with the weight which the tire is designed to carry.

It will readily be seen that the springs, while sufficiently retained in position by their attachment to the steel band, permit the pneumatic tube to be compressed and to expand, while at the same time they prevent any puncture of the inner tube.

I claim:

In combination with the rim of a wheel, a band surrounding said rim, a pneumatic tube around the wheel, and a circumferential series of tubular springs surrounding the pneumatic tube, and secured to the band, each spring consisting of a plate tapering in thickness from its middle to its terminal portions, and said terminal portions overlapping each other, the ends of the tubes formed by the springs being in radial planes transverse to the plane of the wheel, and the terminal portions of the tubes, being reduced in thickness on the outside at one end and on the inside at the other end and said reduced portions overlapping.

In testimony whereof I have hereunto set my hand in the presence of two subscribing witnesses.

EDWARD F. ROLFF.

Witnesses:
F. M. WRIGHT,
D. B. RICHARDS.

---

Copies of this patent may be obtained for five cents each, by addressing the "Commissioner of Patents, Washington, D. C."